United States Patent [19]

Truninger

[11] Patent Number: 4,475,848
[45] Date of Patent: Oct. 9, 1984

[54] COMPACT VACUUM CONVEYOR APPARATUS

[75] Inventor: Thomas Truninger, Zurich, Switzerland

[73] Assignee: Adna Aktiengesellschaft, Vaduz, Liechtenstein

[21] Appl. No.: 386,047

[22] Filed: Jun. 7, 1982

[51] Int. Cl.³ .............................................. B65G 53/54
[52] U.S. Cl. ................................................. 406/115
[58] Field of Search ............... 406/113, 114, 115, 116, 406/167, 168, 39

[56] References Cited

U.S. PATENT DOCUMENTS

| 594,449 | 11/1897 | Weber | 406/116 |
|---|---|---|---|
| 3,273,942 | 9/1966 | McFarland | 406/115 |
| 4,019,641 | 4/1977 | Merz | 406/116 |
| 4,221,506 | 9/1980 | Shapunov et al. | 406/115 X |

FOREIGN PATENT DOCUMENTS

| 1258334 | 1/1968 | Fed. Rep. of Germany | 406/116 |
|---|---|---|---|
| 2262775 | 6/1973 | Fed. Rep. of Germany | 406/115 |
| 2751529 | 5/1979 | Fed. Rep. of Germany | 406/115 |

*Primary Examiner*—Jeffrey V. Nase
*Attorney, Agent, or Firm*—Watson, Cole, Grindle & Watson

[57] ABSTRACT

A compact vacuum conveyor apparatus for the pneumatic conveyance of loose bulk materials includes a separator, a delivery device, a vacuum pump aggregate and the necessary appurtenances which are operationally assembled and contained in a support cabinet of rectangular parallelepipedal shape and of about the size of a large shipping container which can be loaded onto a truck. A hollow tubular conveyor extends from and is supported on the front wall of the cabinet and is connected to the separator. A crane structure supports the conveyor and is likewise mounted on the front wall of the cabinet, a compression chord of the crane being supported on bearing lugs along the cabinet front wall, and being upwardly and downwardly pivotable about a horizontal axis of rotation by means of hydraulic piston and cylinder units extending between a tension chord of the crane and the roof of the cabinet. The tubular conveyor includes a telescoping tube arrangement as a horizontal segment, and has a vertical segment including a flexible intermediate member. The horizontal segment may be adjusted to the desired length by a tugging device. When loaded onto a vehicle, the apparatus may be used as a mobile installation, or may be deposited at the site as a stationary installation or, when coupled with a slewing gear arrangement, may form a slewing installation.

9 Claims, 2 Drawing Figures

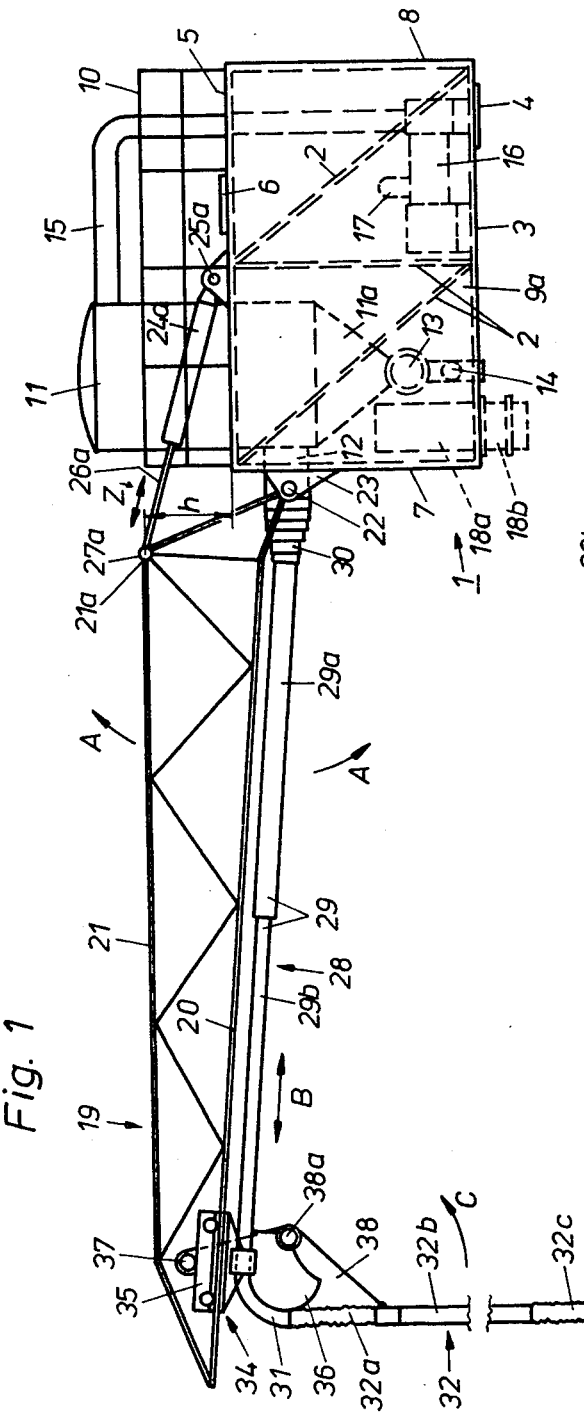
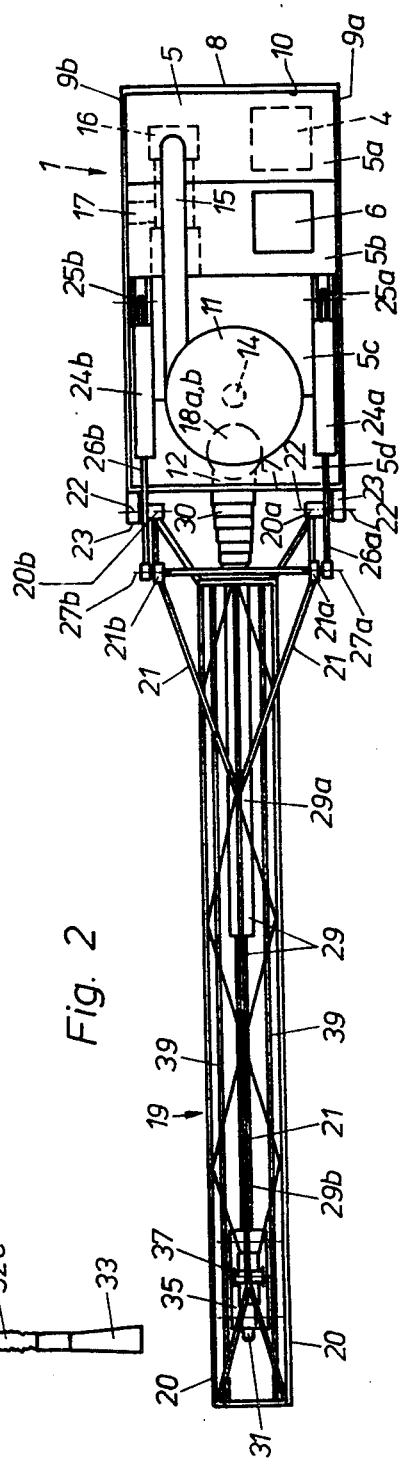
Fig. 1
Fig. 2

COMPACT VACUUM CONVEYOR APPARATUS

BACKGROUND OF THE INVENTION

This invention relates generally to a compact vacuum conveyor apparatus for the pneumatic conveyance of loose bulk materials. The apparatus includes a transportable support cabinet which contains a bulk material separator having a delivery device, a vacuum pump aggregate connected to the separator, and the necessary appurtenances, a hollow tubular conveyor being connected to the separator and extending outwardly of the cabinet.

At large ports equipped for the trans-shipment of loose bulk materials, large stationary pneumatic conveyor systems are employed for unloading pulverulent and small-sized bulk materials. Each such system typically includes one or more pipe line conveyors connected to a powerful cyclone separator, the conveyors extending, for example, for hundreds of meters in length and being more than twenty meters in height. Such large vacuum conveyance installations, however, require considerable investment in capital and are quite costly to operate.

Mobile vacuum conveyance installations are also known in which the separator with the vacuum pump aggregate and the tubular conveyor as well as the necessary servicing equipment are disposed on a wheeled vehicle or on a vessel. The undercarriage (vessel or truck) for the mobile vacuum conveyance installation, however, involves additional expenditures which comparable with those of the installation itself and, since the size of the undercarriage must correspond to the size of the vacuum conveyance installation, mobile installations of this type are, for reasons of expenditure, in most instances, constructed for smaller outputs requiring shorter conveyance distances and lower heights.

In smaller ports, a large stationary installation for the pneumatic unloading of loose bulk materials is often out of the question. Replacing it by a plurality of mobile smaller vacuum conveyance installations is, however, often much too expensive because of the high capital cost and above all because of the maintenance involved. Thus, particularly in industrially less-developed countries, the advantages obtained with the pneumatic unloading of loose bulk materials, such as its great adaptability to the prevailing conditions of unloading, dustfree unloading, and the like, are unattainable.

SUMMARY OF THE INVENTION

It is therefore an object of the present invention to provide a compact vacuum conveyor apparatus for the pneumatic conveyance of loose bulk materials with an about average output which is more cost effective to manufacture as well as to maintain relative to a comparable mobile vacuum conveyance installation.

This general objective is attained in accordance with the invention by the provision of a support cabinet adapted to be transported by an undercarriage such as a wheeled vehicle, the cabinet including a parallelepiped having front, back, side, top and bottom walls. The cabinet contains a separator for the bulk material, a delivery device on the separator, a vacuum pump aggregate connected to the separator, and associated operating devices of an operational assembly. A hollow tubular conveyor for the loose bulk materials is connected to the separator and extends outwardly of the front wall of the cabinet.

A structurally stable, rectangular parallelepipedal cabinet according to the invention possesses numerous advantages in that it may be of substantially the same size as a bulk shipping container which is self-contained since it includes all the necessary components of the vacuum conveyor in an operational assembly and is capable of being moved onto a truck, for example, by a crane without difficulty and within a short period of time, thereby forming with the truck a mobile vacuum conveyance installation with all its advantages. The truck is required only for the time during which it becomes necessary to employ the vacuum conveyor as a mobile unit, for example, for unloading small quantities of loose bulk materials at different locations. Otherwise, the compact vacuum conveyor is merely transported with the truck to a desired site and deposited there as a stationary vacuum conveyance installation, the truck then being available for other purposes. Lastly, the cabinet which forms the main structural component of the compact vacuum conveyor apparatus according to the invention, is also capable of being operatively coupled with an existing slewing gear arrangement to thereby provide a vacuum conveyance installation which is pivotable about a vertical axis of rotation.

The rectangular parallelepipedal cabinet allows for easy mounting, maintenance and servicing of the vacuum conveyor because of the practical location of the individual structural parts and operating equipment, whereby the time required for mounting and maintenance is reduced to a minimum, thus resulting in cost savings and insuring constant operational readiness of the vacuum conveyor. Because of such constant readiness, time required for preparing the vacuum conveyor for use as a mobile, stationary or slewable installation is confined to loading and transport and, if required, to unloading the conveyor. Compared with conventional stationary and mobile vacuum conveyance installations, the operational period of the apparatus according to the invention is reduced quite insignificantly, since the compact vacuum conveyor does not have its own undercarriage and a single truck only need be provided only temporarily for successively transporting a plurality of such vacuum conveyors. The compact vacuum conveyor apparatus of the invention also results in considerable savings in capital expenditures and maintenance costs.

Other objects, advantages and novel features of the invention will become more apparent from the following detailed description of the invention when taken in conjunction with the accompanying drawings.

BRIEF DESCRIPTION OF THE DRAWINGS

FIG. 1 is a schematic representation, in side elevation, of the compact conveyor apparatus according to the invention; and FIG. 2 is a top plan view of the apparatus of FIG. 1.

DETAILED DESCRIPTION OF THE INVENTION

The compact vacuum conveyor apparatus shown in the drawings includes a structurally stable support cabinet 1 substantially in the form of a rectangular parallelepiped and approximately the size of a large shipping container with a maximum width of about 250 cm so that it can, for example, be accommodated on a truck. Cabinet 1 may be of any desired construction which comprises, for example, a framework of girders, struts and supports 2, only several of which are shown in FIG. 1 for the sake of clarity. The framework may be open or, if desired, may be lined with walls or may be in the form of a shell structure. In the illustrated embodiment, cabinet 1 is about 220 cm high and has a fixed floor 3 in which a closeable entrance hatch 4 is provided, and has a roof structure 5 structured to form a floor deck 5a to 5d with a closeable exit hatch 6 and having a surrounding safety railing 10. The cabinet contains a separator 11, a vacuum pump aggregate 16 and the necessary equipment (not shown) for the operation of the vacuum separator and the vacuum pump aggregate.

Separator 11 is disposed upright in cabinet 1 and is preferably in the form of a cyclone separator of conventional construction having a built-in dust filter and a conical bottom 11a for collecting the conveyed loose bulk material. And, the separator includes a delivery device 13 which has, for example, a compartment rotor for continuous delivery. The material delivered by device 13 is conveyed outside the cabinet through a delivery channel 14. This channel may be arranged for delivery of the material through bottom wall 3 or through one of the side walls 9a, 9b of the cabinet, or optionally through the bottom or through one of the side walls. Separator 11 is disposed in the cabinet so that its entry socket or channel 12 extends through front wall 7 of the cabinet and is disposed closely adjacent the underside of roof 5. In such an arrangement, the upper portion of separator 11 will protrude outwardly of the cabinet through a suitably provided opening in roof 5.

Vacuum pump aggregate 16 is also of conventional construction and, depending on the output, comprises at least one motor-driven vacuum air pump, for example a piston pump. A delivery air pipe 15 extends between the vacuum pump aggregate 16 and separator 11. Since this delivery air pipe is connected to the upper portion of the separator which protrudes outwardly of roof 5, pipe 15 likewise protrudes through an opening provided in roof 5 of the cabinet. The exhaust air of vacuum pump aggregate 16 is expediently carried off to atmosphere by an exhaust air duct 17 which may extend through roof 5 or through side wall 9b of the cabinet.

Normally, the separator and the vacuum pump aggregate are heavy and voluminous structures. To ensure their easy insertion into cabinet 1, roof 5 and/or rear wall 8 of the cabinet may be removable, or at the least the roof may, because of its large size, be comprised of a plurality of easily manipulable roof sections 5a, 5b, 5c, 5d. Large side walls 9a and 9b of the cabinet may, on the other hand, be fixedly mounted in place. Site openings or windows and an additional door, preferably in rear wall 8, may also be provided in the cabinet.

For mounting the cabinet on a slewing gear arrangement, the central longitudinal portion of floor 3 may, in the area of the center gravity of the conveyor apparatus, be constructed to accommodate a specifically designed or existing slewing gear, depending on its type. And, suitable support and collar bearings 18a may, if desired, be provided in the cabinet for the slewing gear arrangement, together with a stationary column, or suitable support and column bearings 18b may be provided on floor 3 of the cabinet for a slewing gear having a rotatable column. Such bearings may be omitted for an arrangement having a rotary table.

A luffing crane 19 is supported on front wall 7 of the cabinet and extends outwardly thereof, the crane being of lattice construction having a compression chord 20 supported by lugs 20a, 20b on axle box supports 23 for pivotal movement in the directions of arrows A about a horizontal axis of rotation 22. Supports 23 are disposed on front wall 7 on opposite sides of socket 12. The vertical clearance of horizontal rotational axis 22 from roof 5 of the cabinet, and a vertical clearance h of crane 19 at its end 21a, 21b near the cabinet are coordinated so that end 21a, 21b of a tension chord 21 of the crane adjacent the cabinet is disposed sufficiently far above the top of roof 5 of the cabinet and allows for the provision of a traction device Z which extends between the top of the cabinet roof and tension chord 21 to effect upward and downward slewing movement of crane 19 in the directions of arrows A. Traction device Z may be of any desired type which, in the illustrated embodiment, comprises a pair of hydraulic piston and cylinder units 24a, 24b which are pivotally supported in bearings 25a, 25b at the longitudinal sides of roof 5, piston rods 26a, 26b of these units being articulated to tension chord 21 in bearings 27a, 27b. Although the two hydraulic piston and cylinder units 24a, 24b require a corresponding configuration of tension chord 21, they permit unhindered mounting of separator 11 within cabinet 1, and present particularly advantageous construction conditions with regard to obtaining tensile forces and opposed compression forces. Compression chord 20 of the crane supports a hollow tube conveyor 28 connected at its inner end to socket 12 of the separator.

The tube conveyor comprises a horizontal segment 29 in the form of a telescoping tube arrangement 29a, 29b which is connected at its discharge and inner end to socket 12 of the separator via a flexible pipe segment 30, and at its influx end carries a tubular bend element 31 which supports a connecting, hollow vertical pipe segment 32. This vertical segment comprises a flexible intermediate member 32a connected to element 31, and a connecting rigid tubular conveyor segment 32b which supports a suction nozzle 33 via a further flexible intermediate segment 32c for suctioning the loose bulk materials.

Horizontal segment 29 of the tubular conveyor, which comprises the telescoping tube arrangement, can be extended or retracted, in the directions of double arrow B by a tugging device 34 which is serviced and controlled from cabinet 1, so as to obtain the desired length of the tubular conveyor. This tugging device may be of any desired construction, and preferably comprises an electrically driven trolley 35 in rolling engagement for movement along a pair of rails 39 supported on compression chord 20 of the crane, tubular bend element 31 of the hollow tube conveyor being affixed to the trolley in some normal manner. A semicircular deflection guide plate 36 is secured at the inner side of bend 31, flexible segment 32a bearing against this guide element when vertical segment 32 is moved inwardly toward horizontal segment 29 in the direction of arrow C. This is particularly useful during the transport of the present apparatus in order to avoid obstruction by an otherwise freely hanging segment 32 and consequent damage thereto. This inward movement of vertical segment 32 is effected by the cable 38 secured to the upper end of rigid segment 32b and extending via deflection rollers 38a on the tugging device toward, for example, an electric cable hoist 37 mounted on device 34 or as shown, in the cabinet. In a non-use condition, horizontal segment 29 is retracted, vertical segment 32 is moved inwardly toward segment 29 into a substantially parallel relationship, and suction nozzle 33 is secured to a mounting (not shown) on the cabinet, the mounting being arranged so that it may also be released from the interior of the cabinet. For easy control, servicing and any required repair, crane 19 may be equipped with a catwalk (not shown) of known construction.

The structural portion of the compact vacuum conveyor apparatus according to the invention, which assures easy transportation, for use as a mobile, stationary or rotatable installation, as well as easy adaptability to prevailing conditions, is the rectangular parallelepipedal cabinet 1 which, in the disclosed embodiment, is constructed in a manner to save costs and may be of a low height. For economic manufacture of the cabinet with prefabricated parts, standard floors 3 and roof 5 and side wall 7, 8, 9a, 9b in two or more different heights, may be provided.

Cabinet 1 facilitates installation of commercial separators, vacuum pump aggregates and other appurtenances required for a pneumatic conveyance operation, as well as any necessary energy supply, and makes it possible to prepare, with but a few types of equipment, a production program to which an extensive range of conveyance output and distance may be covered. And, a vacuum conveyor may be provided for any specific purpose which is optimal as to construction and cost. Thus, for example, hydraulic piston and cylinder units 24a, 24b of crane 19 may be of an easily mountable type so that, without further construction alterations, luffing cranes of varying lengths may be attached to the cabinet. Otherwise, these hydraulic units may be replaced by a rod structure, as desired to provide a rigid crane or to eliminate the crane altogether, if only a flexible tube conveyor is to be used for unloading. Also, the roof of the cabinet may be so constructed that, instead of two hydraulic piston and cylinder units, a different drawgear can be attached or only one hydraulic piston and cylinder unit may be disposed along the longitudinal centerline of the cabinet when a small separator 11 is utilized which does not project beyond the roof of the cabinet.

Obviously, many other modifications and variations of the present invention are made possible in the light of the above teachings. It is therefore to be understood that within the scope of the appended claims the invention may be practiced otherwise than as specifically described.

What is claimed is:

1. A compact vacuum conveyor apparatus for the pneumatic conveyance of loose bulk materials, comprising a support cabinet adapted to be transported by an undercarriage, said cabinet comprising a parallelepiped having front, back, side, top and bottom walls, and said cabinet containing: a separator for the bulk material; a delivery device on said separator; and a vacuum pump aggregate connected to said separator; said apparatus further including a hollow tubular conveyor being connected to said separator and extending outwardly of said front wall of said cabinet; and an elongated support arm mounted on said front wall, said tubular conveyor being supported on said support arm; said tubular conveyor comprising a horizontal segment connected at one end to said separator, said segment comprising a telescoping hollow tube arrangement, a tubular bend element at the other end of said segment, a vertical tubular segment connected to said bend element, said vertical segment including a flexible tube connected to said tubular bend element to facilitate movement of said vertical segment toward and away from said horizontal segment; a flexible, intermediate tubular segment connected to said vertical segment, and a suction nozzle connected to said flexible segment; said support arm including a pair of longitudinally extending rails, a trolley movable along said rails and being secured to said tube arrangement adjacent said other end of said horizontal segment for extending and retracting said tube arrangement, and hoist means on said trolley including a wind-up cable connected to said vertical segment for effecting said movement.

2. The apparatus according to claim 1, wherein a flexible member disposed outwardly of said front wall of said conveyor is provided for connecting said tubular conveyor to said separator, brackets extending outwardly of said front wall on opposite sides of said flexible member, said support arm being mounted for pivotal movement about a horizontal axis on said brackets, and traction means extending between said cabinet and said support arm for effecting said pivotal movement within a predetermined angular range.

3. The apparatus according to claim 2, wherein said support arm comprises a structure having spaced, longitudinally extending compression and tension chords, said compression chord being supported on said brackets, said traction means extending between an end of said tension chord and said top wall of said cabinet, said end of said tension chord being disposed above said top wall a predetermined distance to permit said pivotal movement within said predetermined range.

4. The apparatus according to claim 3, wherein said traction means comprises at least one hydraulic piston and cylinder unit.

5. The apparatus according to claim 4, wherein said traction means comprises a pair of hydraulic piston and cylinder units, the cylinders thereof lying above said top wall of said cabinet.

6. The apparatus according to claim 5, wherein said top wall comprises a walkable roof surrounded by a guard railing and having a removable exit hatch for access to said separator and to said vacuum pump aggregate.

7. The apparatus according to claim 6, wherein said back wall of said cabinet is removable.

8. The apparatus according to claim 7, wherein said bottom wall of said cabinet includes an entry hatch.

9. The apparatus according to claim 8, wherein said bottom wall includes support and journal bearings for mounting said cabinet on a support column of a slewing gear arrangement.

* * * * *